US007017105B2

(12) United States Patent
Flanagin et al.

(10) Patent No.: US 7,017,105 B2
(45) Date of Patent: Mar. 21, 2006

(54) DELETING OBJECTS FROM A STORE OF A DEVICE

(75) Inventors: Stephen D. Flanagin, Sammamish, WA (US); Greg S. Friedman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 09/775,953

(22) Filed: Feb. 2, 2001

(65) Prior Publication Data

US 2002/0108091 A1 Aug. 8, 2002

(51) Int. Cl.
*G06F 11/00* (2006.01)
*G06G 15/16* (2006.01)

(52) U.S. Cl. ........................................ 714/798; 709/236

(58) Field of Classification Search ................. 714/798; 709/236

See application file for complete search history.

(56) References Cited

U.S. PATENT DOCUMENTS 5,710,922 A * 1/1998 Alley et al. ................. 707/201
5,758,354 A * 5/1998 Huang et al. ............... 707/201
6,052,735 A * 4/2000 Ulrich et al. ............... 709/236
6,324,544 B1 * 11/2001 Alam et al. ................. 707/201
6,370,566 B1 * 4/2002 Discolo et al. ............. 709/206
6,463,427 B1 * 10/2002 Wu ............................... 707/3

FOREIGN PATENT DOCUMENTS

WO WO 00/48096 8/2000

OTHER PUBLICATIONS

Balasubramaniam, S., et al., *What is a File Synchronizer?*, International Conference on Mobile Computing and Networking Conference, Oct. 25–30, 1998, pp. 98–108.

Baquero, C., et al., *Using Structural Characteristics for Autonomous Operation,* Operating Systems Review, vol. 33, No. 4, Oct. 1999, pp. 90–96.

Harbaugh, L., *Mobile Synchronization [computers]*, Information Week, No. 740, Jun. 23, 1999, pp. 34–38.

* cited by examiner

*Primary Examiner*—Guy J. Lamarre
*Assistant Examiner*—Esaw Abraham
(74) *Attorney, Agent, or Firm*—Workman Nydegger

(57) ABSTRACT

Systems, methods, and computer program products for deleting objects from device stores without deleting corresponding objects from one or more synchronization partners. A device has a device sync module for each synchronization partner and each device sync module maintains tracking data. Alternatively, a single device sync module manages the tracking data of each synchronization partner. When an object does not meet parameters of a synchronization filter, a soft delete request is made to the wireless device. A sync manager receives the soft delete request and determines from the other device sync modules that have registered with the sync manager whether they continue to synchronize the object. If none of the other device sync modules protest, the object is deleted. If one of the device sync modules objects to the delete request, then the delete is denied. The tracking data for all of the device sync modules is appropriately modified.

23 Claims, 4 Drawing Sheets

DELETING OBJECTS FROM A STORE OF A DEVICE

BACKGROUND OF THE INVENTION

1. The Field of the Invention

The present invention relates to systems and methods for deleting objects from a wireless device. More particularly, the present invention relates to systems and methods for deleting objects from a store of a wireless device without causing a corresponding object on a synchronization partner to be deleted when the wireless device synchronizes with the synchronization partner.

2. Background and Related Art

Wireless mobile, and other portable devices, such as personal digital assistants (PDAs) and cellular telephones, provide a user with many advantages. They are convenient to use and are easily carried on one's person. These conveniences are partially responsible for the popularity of wireless devices, which are increasing in both number and use. People are using their wireless devices to store contact information, calendar information, electronic messages, and even for Internet access. Wireless devices provide so many useful features that to many people, wireless devices are more than a convenience, they are a necessity.

Although wireless devices provide many important and useful functions, it is their size that can actually be a disadvantage, because the size and low cost of wireless devices places a practical limit on the amount of memory they have. The limited memory of wireless devices is not, however, surprising. After all, server and desktop computers also have limited memory. The major difference is that server and desktop computers typically have significantly more memory than wireless devices and are therefore able to store substantially more information.

The limited memory of wireless devices can present a problem in some circumstances, because much of the information stored by wireless devices is subject to becoming stale from the perspective of the wireless device. Electronic messages, for example, are often download from a server and opened on a wireless device. Because the electronic message is stored on the wireless device, it consumes some of the memory of the wireless device. In some instances, the user may desire to keep the electronic message in the memory of the wireless device for a short time, but the electronic message will eventually become stale and the memory will be needed for other purposes.

While the user may store the electronic message at the server indefinitely, it is not practical to indefinitely store the electronic message in the memory of the wireless device because the memory of the wireless device is limited. Similarly, calendar information often becomes stale after their corresponding dates have past. For example, a user often keeps appointments on their wireless devices. After the user has kept the appointment, however, that information is stale and no longer needed on the device, although the user may desire to keep a permanent record of the appointment on the server for future reference. Contact information can change or become outdated as well. More generally, the memory of wireless devices can become full of stale information and the user may want to delete the stale information such that new or more current data can be stored in its place.

For at least this reason, information stored on wireless devices is routinely updated or synchronized using filters that are configured to identify data that the user desires to synchronize or update. Data that is excluded by the filter is identified as stale or old data. Once the stale data is identified, it is not longer synchronized and may be deleted from the store of the wireless device. Unfortunately, many wireless devices synchronize with many different synchronization partners and deleting an object from the store of the wireless device can result in the same object being inadvertently deleted from one or more of the synchronization partners. This problem, however, does not just occur in the context of synchronization. A user may, for example, simply delete data from their device. In this case, the direct deletion of stale data can be carried over to the device's synchronization partners.

The problem, therefore, is allowing a user to delete objects from a device without deleting corresponding or replicated objects from the synchronization partners of the device. For example, assume that a user synchronizes calendar data with an office server. At a later time, the user synchronizes the calendar data with a desktop computer, During the synchronization with the desktop computer, older calendar items that are not within a synchronization filter are deleted from the store of the wireless device.

When the wireless device synchronizes with the office server at a later time, the same objects that were deleted from the store of the wireless device during synchronization with the desktop computer will also be deleted from the store of the office server. Instead of simply deleting objects from the device to free some of the memory of the device, data objects are inadvertently deleted from the office server. This is not always advantageous because people often desire to keep or archive objects, data or other information on their office servers or other synchronization partners because they typically have sufficient memory to store those objects indefinitely.

SUMMARY OF THE INVENTION

The present invention relates to systems and methods for deleting objects from a store that is synchronized with the stores of other synchronization partners. The present invention allows for the automatic deletion of data that is no longer needed by a user. Thus, stale data will be automatically deleted from the store without additional interaction from the user. During synchronization with a synchronization partner, a user employs a filter that determines which data is synchronized. The filter describes criteria that data must meet in order to be synchronized. For example, the filter may be configured to exclude data that is older than 3 months from being synchronized.

Data that does not meet the requirements of the filter is automatically removed from the device, which frees the memory of the device for other uses. However, many devices synchronize their store with more than one synchronization partner. The present invention insures that the data being deleted from the store of the device is not also deleted from other synchronization partners. Thus, the deletion is not propagated inadvertently.

Each synchronization partner of the wireless device synchronizes through a device sync module operating at the wireless device. The device sync module accesses tracking data that is maintained for each synchronization partner to determine what needs to be synchronized. When a device synchronizes with a certain synchronization partner, certain data objects are excluded by a filter. Because these data objects are excluded from the synchronization they are also targeted for deletion and a delete request for those objects is made by the device sync module. A sync manager queries the device sync module to determine if other synchronization partners are still synchronizing the objects for which a delete request has been received. If the targeted objects are being synchronized by other synchronization partners, the device sync module has the option of preventing the deletion of the identified objects. In this case, the device sync module no longer synchronizes the identified objects with the corresponding synchronization partner, but the identified objects are not deleted from the wireless device.

If the identified objects are not being synchronized by any synchronization partners and there is no other objection to deleting the identified objects, then they are deleted. The device sync module insures that the deletion of the identified objects is not propagated to the remaining synchronization partners during future synchronizations. In this manner, objects that do not meet the requirements of a filter can be safely and automatically deleted from the store of a wireless device without inadvertently deleting the identified objects from the synchronization partners.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
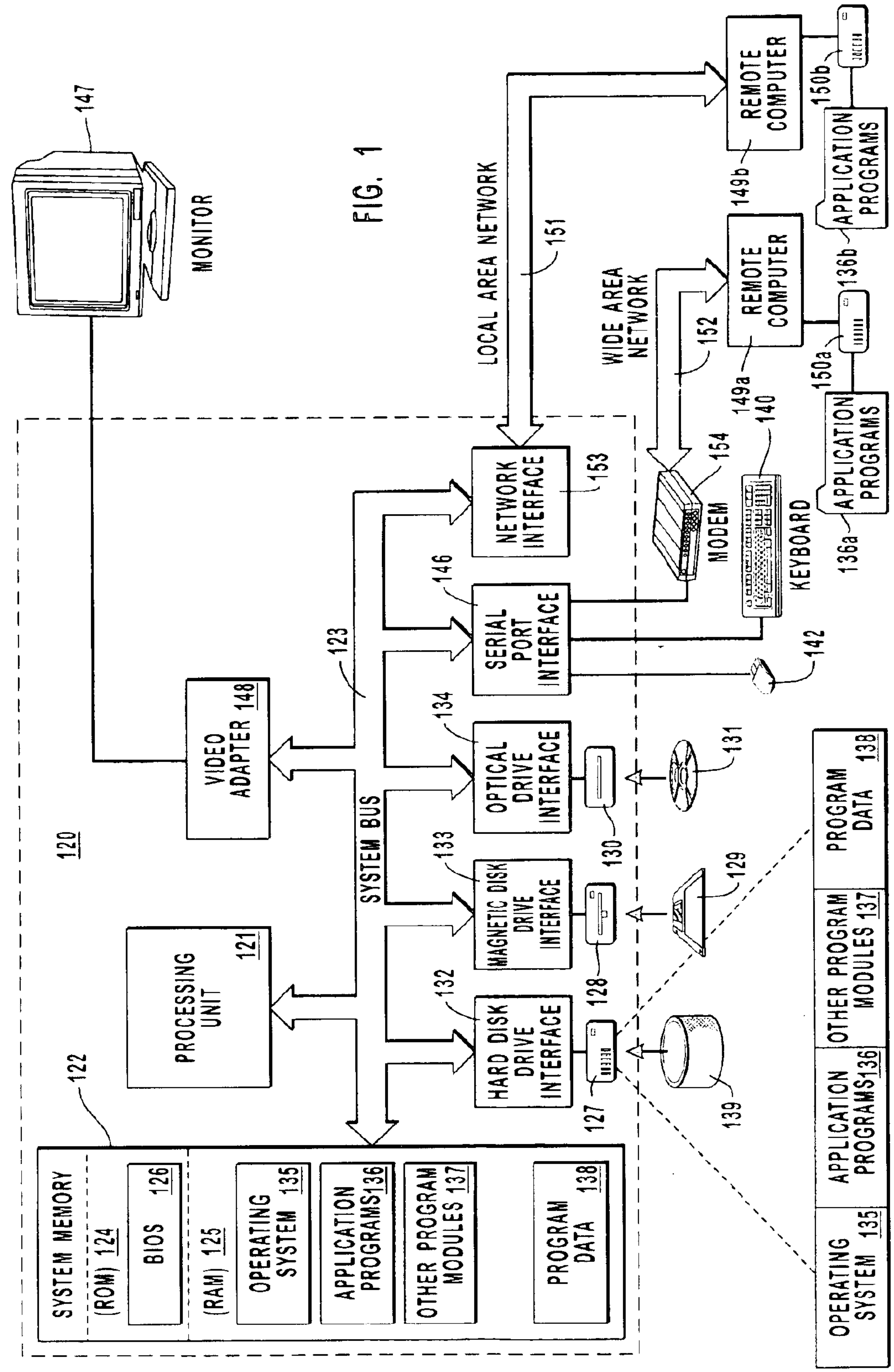
FIG. 1 illustrates an exemplary system that provides a suitable operating environment for the present invention.

While wireless and portable devices provide many advantages, they often have limited memory. The limited memory of wireless devices can be a significant disadvantage, because wireless devices are increasingly being used to manage data objects such as emails, contact information, calendar information, web pages, and the like. These data objects are subject to frequent change and the data objects stored on the wireless device can become stale and are not important enough to a user to warrant using up the limited memory of the device. As a result, it is often necessary to update or synchronize the wireless device with one or more synchronization partners, removing the stale data objects in the process. The present invention assists in the synchronization and update processes by automatically deleting the stale data from the wireless device. The present invention also insures that the deletion of an object will not be propagated to the synchronization partners during future synchronizations.

The present invention extends to both methods and systems for deleting objects from a store of a wireless device. While the present invention is described with reference to wireless devices, the systems and methods of the present invention can be applied to systems and environments where data is synchronized or replicated between one or more stores. There is no requirement that the store being synchronized exist on a wireless device. Wireless and portable devices, however, typically have limited memory and therefore have a greater need to effectively utilize existing memory. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 30 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 23 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 52 may be used.

Figure 2:
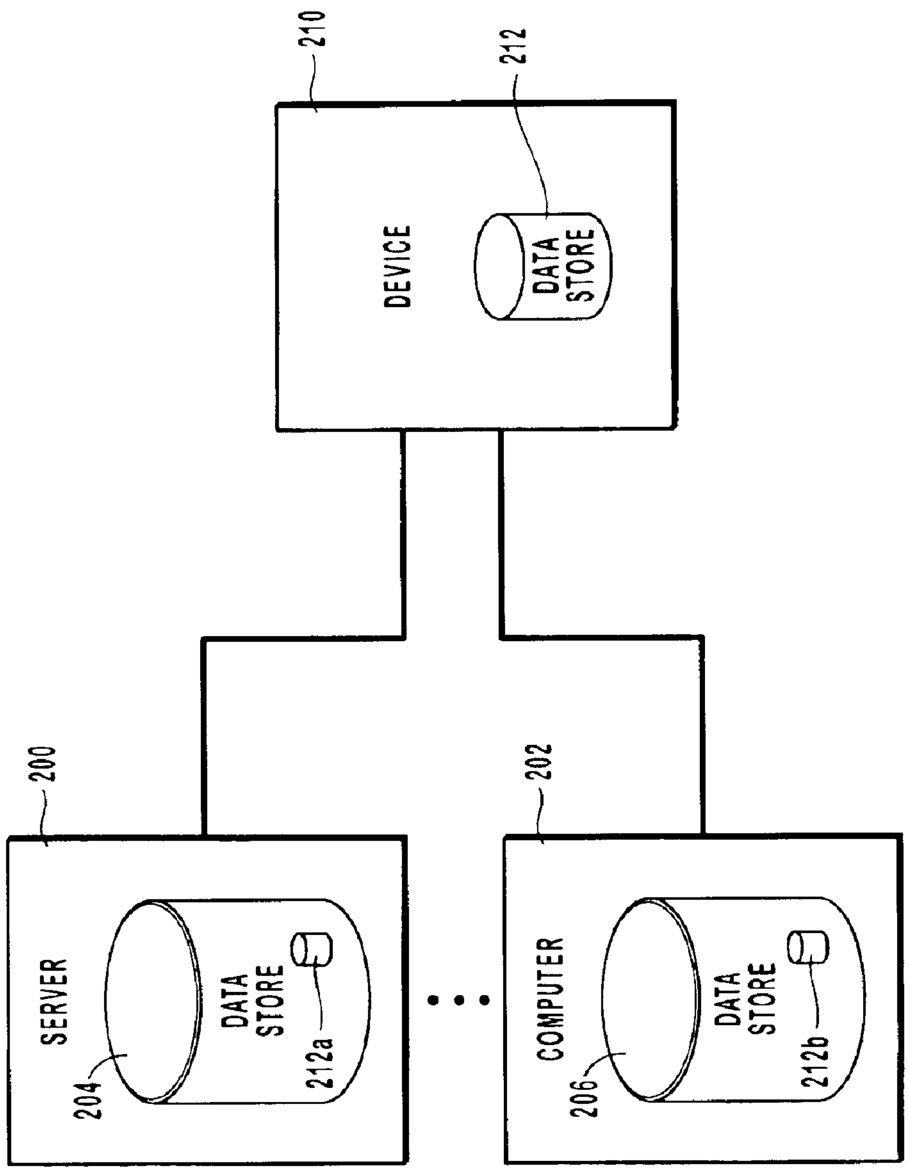
FIG. 2 is a block diagram illustrating a wireless device that synchronizes with one or more synchronization partners.

FIG. 2 is a block diagram depicting an environment in which the systems and methods of the present invention may be implemented. FIG. 2 illustrates a wireless device 210 that has a data store 212. As used in this application, the term "wireless device" should be interpreted broadly to encompass any type of portable and/or hand-held computing device, including wireless telephones, personal digital assistants, pagers, and the like.

The wireless device 210 is capable of communicating with multiple types computers and computer networks. FIG. 2, however, illustrates a wireless device 210 that communicates with a server 200 and a computer 202. Both the server 200 and the computer 202 are examples of synchronization partners for the data store 212 of the device 210. The server 200 and the computer 202 can be in the same computer network or in different computer networks. In some instances, the server 200 and the computer 202 may be stand alone machines. A common scenario is that the server 200 is a work or office computer while the computer 202 is a home computer or a network station.

The server 200 has a store 204 and the computer 202 has a store 206. Typically, the stores 204 and 206 are much larger than the store 212 of the wireless device 210. However, the store 212 is often a duplicate of corresponding portions of the stores 204 and 206. In FIG. 2, the portion of the store 204 that corresponds to the store 212 is represented as storage 212*a*. The portion of the store 206 that corresponds to the store 212 is represented as storage 212*b*. The storage 212*a* is not necessarily the same as the storage 212*b*. The data store 212 typically includes all of the objects in the storage 212*a* and the storage 212*b*, but the data store 212 may not contain all of the properties of the objects stored in the server 200 and the computer 202.

Often, the wireless device 210 will synchronize with either or both of the server 200 and the computer 202. Synchronization is typically required because objects in storage 212*a* or storage 212*b* have changed. Changes to objects can include, but are not limited to, creating an object, storing a new object, deleting an existing object, copying an object, moving and object, and the like. Synchronization may also be necessary because the data in the store 212 may become old or change. When the wireless device 210 synchronizes with the server 200, the changes that occurred to objects in the storage 212*a* are made to the corresponding objects in the store 212 and changes to the objects in the store 212 are made to the corresponding objects in the storage 212*a*. Synchronization with the computer 202 performs similar actions between the storage 212*b* and the store 212. As a result of synchronization, the store 212 of the wireless device 210 is kept current. Whenever an object changes, either at the server or at the wireless device, it is necessary to synchronize. It is understood, of course, that a synchronization will not occur each time an object changes, but that whenever a synchronization does occur, those objects that have changes will be updated.

As previously mentioned, the store 212 is usually smaller than the stores 204 and 206. Because the store 212 is limited, it is not practical to keep old or stale data objects in the store 212 because they consume memory that could be used for newer objects or other purposes of the wireless device 210. For example, emails intended for a user are continually arriving at the store 204. New emails are one example of changed objects. When the wireless device 210 synchronizes with the server 200, the new emails are loaded into the store 212. As a result, both the store 212 and the storage 212*a* have a copy of the new emails. The problem is that the wireless device 210 may not have sufficient memory to properly synchronize the new emails. For at least this reason, it is often necessary to remove old or stale items from the store 212 of the wireless device 210.

Removing or deleting items from the store 212 of the wireless device 210 will free up some memory. As previously described, however, because the wireless device 210 is synchronizing with multiple synchronization partners, some objects may be inadvertently deleted from one or more of the synchronization partners even though the synchronization partners have sufficient memory to store or archive data that is no longer needed on the wireless device 210. The goal achieved by the present invention is the ability to delete objects from the store of the wireless device 210 without deleting the corresponding objects from the synchronization partners.

First, it is necessary to determine what data on the store 212 is ready for deletion or removal. This is often accomplished with a filter used during synchronizations, whose parameters are usually specified by a user, During synchronization, the filter identifies objects or other data that no longer require synchronization. As a result, the synchronization may delete the objects that are not within the parameters of the filter. For instance, if a user is synchronizing calendar data, the filter may be set to exclude data or calendar objects that are more than 2 months old. Data that is excluded by this filter is deemed old or stale with respect to the wireless device 212 and may be deleted from the device 212. The user does not intend for the excluded data to be deleted from the synchronization partners, because the synchronization partners have sufficient storage to indefinitely store or archive the excluded objects. In addition to helping free memory on the wireless device 210 by identifying stale data objects, a filter makes synchronization more efficient by limiting the amount of data that is synchronized to the data that falls within the parameters of the filter.

Figure 3:
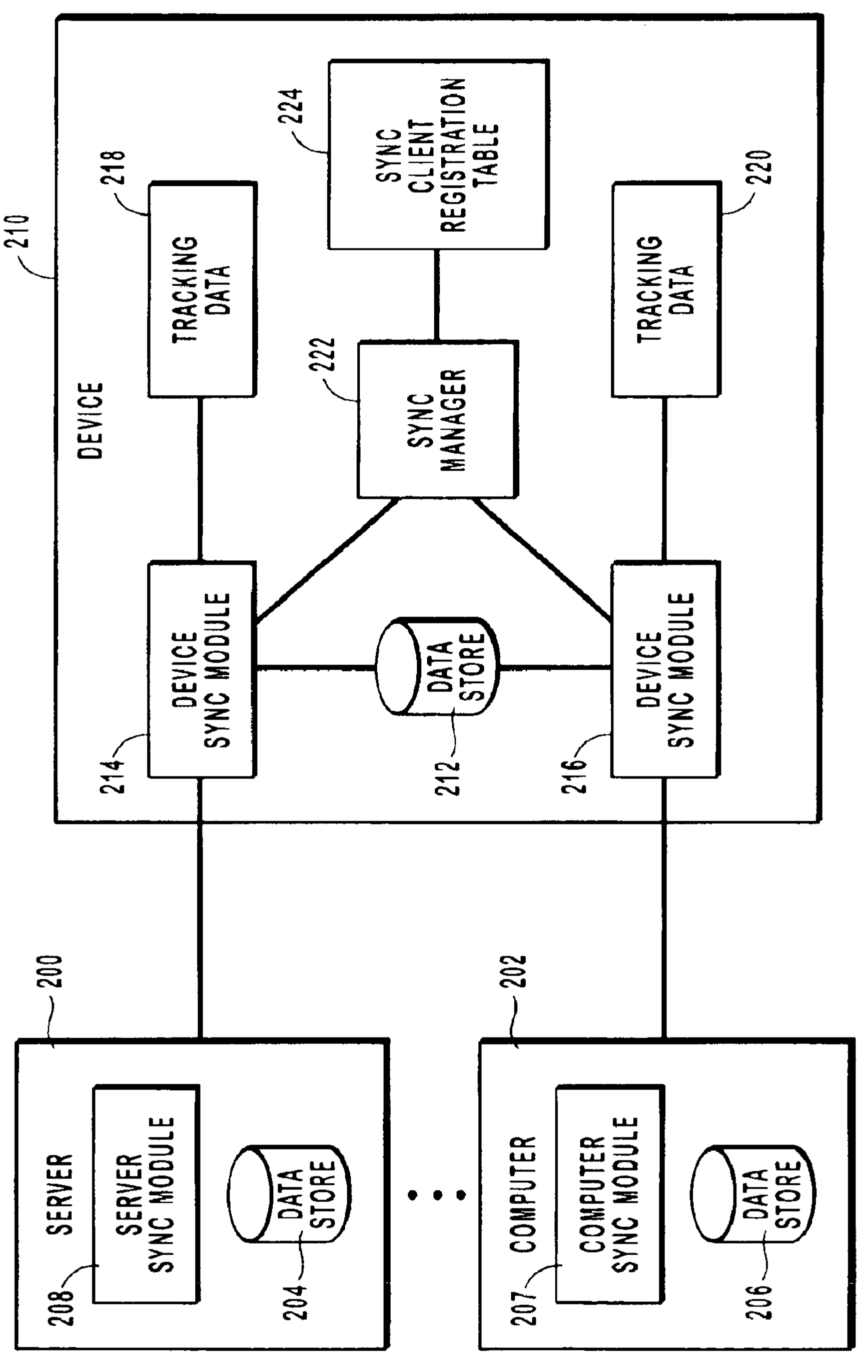
FIG. 3 is a detailed block diagram illustrating a wireless device that synchronizes its data store with one or more synchronization partners without inadvertently deleting an object from the synchronization partners when the corresponding object is deleted from the wireless device.

FIG. 3 is a block diagram used to illustrate how an object that is excluded by a filter may be safely deleted from the wireless device 210 without being deleted from the synchronization partners. As illustrated in FIG. 3, the wireless device 210 has two synchronization partners for this example: server 200 and computer 202. It is understood by one of skill in the art that the wireless device 210 can have any number of synchronization partners. Each synchronization partner has a sync module that is used during synchronization. Thus, the server 200 has server sync module 208 and the computer 202 has the computer sync module 207. The device modules 214 and 216 are shown as separate modules in FIG. 3 for clarity, but it is understood that they can be the same software. The tracking data 218 and 220, however are usually specific to a particular synchronization partner. Thus, when the device 210 is synchronizing with the server 200, the tracking data 218 is used by the device sync module, while the tracking data 220 is used by the device sync module when the device 210 is synchronizing with the computer 202. It is also possible that the computer sync module 207 and the server sync module 208 are the same software. However, different data tables are accessed.

The wireless device 210 establishes a device sync module for each synchronization partner. Thus, the device sync module 214 operates with the server sync module 208 and the device sync module 216 operates in conjunction with the computer sync module 207. Each device sync module maintains tracking data that contains information about the objects or data that is being synchronized between the wireless device 210 and the relevant synchronization partner. In FIG. 3, the tracking data 218 tracks objects being synchronized between the wireless device 210 and the server 200 while the tracking data 220 tracks objects synchronized between the wireless device 210 and the computer 202.

The wireless device 210 also has a sync manager 222 that controls or manages the device sync modules. This information is maintained by the sync manager 222 in a sync client registration table 224. In this example, all device sync modules that sync a particular store register with the sync manager 222. The table 224 stores, for example, a store identifier and a sync client/synchronization partner identifier pair. In this case, the table 224 is used to register all of the device sync modules that synchronize the store 212. More specifically, the table 224 indicates that the device sync module 214 is synchronizing the store 212 to the store 204 and that the device sync module 216 is synchronizing the store 212 to the store 206. If the wireless device 210 had an additional store, then the registration information could be stored in the table 224 or in a separate registration table.

The following example of safely deleting objects from a store of a wireless device is described with reference to FIG. 3. This example begins assuming that that the device sync module 214 has successfully synchronized the store 212 with the store 204 using a particular filter. As a result of the synchronization between the wireless device 210 and the server 200, both the store 204 and the store 212 have an object X stored therein. Next, the device sync module 216 successfully synchronizes the store 206 of the computer 202 with the store 212 of the wireless device 210 using the same particular filter. At this point, the stores 204, 206 and 212 all contain the object X.

At a later time, the device sync module 214 synchronizes with the store 204 of the server 200. However, the object X is now excluded by the filter. For example, the object X may be 4 days old and the filter only synchronizes data that is 3 days old and newer. Because the object X has been excluded by the filter, the server 200 sends a soft delete to the device sync module 214 indicating that the object X may be removed from the store 212. The device sync module 214 updates its record for object X in the tracking data 218 such that the object X will not be synchronized in the future. Next, the device sync module 214 requests a soft delete from the sync manager 222. The soft delete request is different from a hard delete request, where the object was deleted at the server 200 and the server 200 directs the device sync module 214 to delete the object from the store 212 without interacting with the sync manager 222.

Before the sync manager 222 allows the device sync module 214 to delete the object X from the store 212, the sync manager 222 determines whether the object X is being synchronized with another synchronization partner. Because all device sync modules that are synchronizing the store 212 have registered with the sync manager 222, the sync manager 222 is able to determine from the other device sync modules whether they are tracking or synchronizing the object X. In this case, the sync manager 222 informs the device sync module 216 that a soft delete request for the object X has been received from the device sync module 214.

The device sync module 216 can respond in several different ways. First, the device sync module 216 can inform the sync manager that it is still synchronizing the object X, which effectively cancels the soft delete request. In this case, the sync manager 222 will not permit the device sync module 214 to delete the object X from the store 212, and the object X will continue to reside in the store 212. The device sync module 214, as previously stated, will not track or synchronize the object X.

Alternatively, the device sync module 216 can inform the sync manager 222 that the object X may be deleted from the store 212. The device sync module 216 may allow the object X to be deleted, for example, if the object X is also excluded by the filter used by the device sync module 216, or if the device sync module 216 is programmed to treat soft deletes as hard deletes. In this case, the sync manager 222 will allow the object X to be deleted or removed from the store 212.

The device sync module 216 also has other options when a soft delete request is approved. For instance, the device sync module 216 can keep track that the object X was soft deleted and notify the computer 202 during the next synchronization between the wireless device 210 and the computer 202. The computer 202 can keep the object X in the store 206 while the device sync module 216 updates is record for the object X in its tracking data 220. As a result, the deletion of the object X from the store 212 will not be propagated to the computer 202.

As described, a soft delete can prevent an object from being inadvertently deleted from the store of a synchronization partner. For example, without the systems and methods of the present invention as described herein, a synchronization between the server 202 and the wireless device 210 can cause objects that are excluded by the filter to be deleted from the store 212. On a subsequent synchronization between the wireless device 210 and the server 200, the same objects will be deleted from the store 204 of the server 200. Users typically do not want these objects deleted from the server 200.

Figure 4:
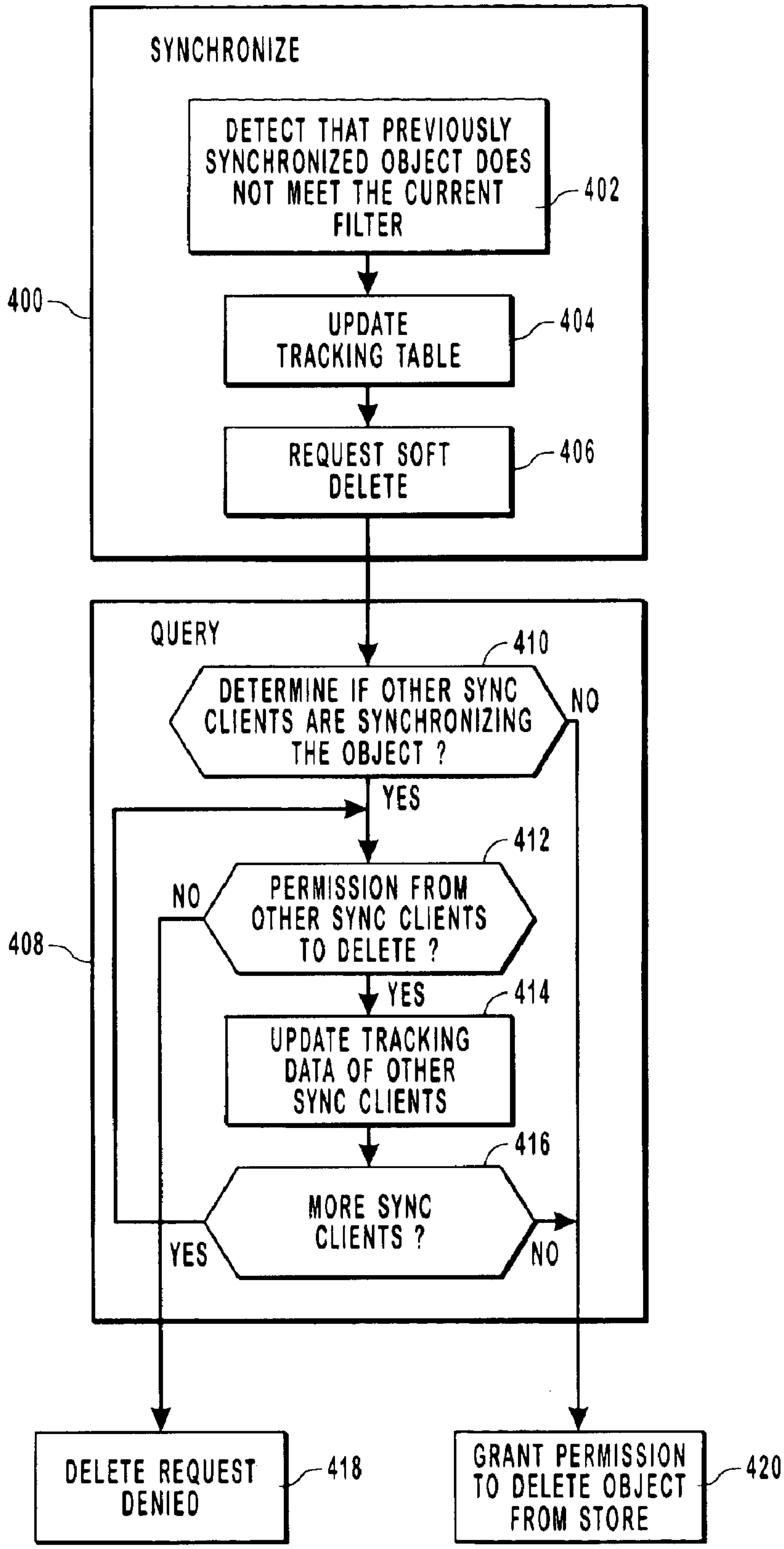
FIG. 4 is a flow diagram that describes how an object may be deleted from a wireless device without deleting the corresponding object from the synchronization partners.

FIG. 4 is a flow diagram used to illustrate how an object is soft deleted from a store. First, a step (400) for synchronizing a store of a wireless device with a store of a synchronization partner occurs. Synchronizing (400) can include an act (402) of detecting that a previously synchronized object is excluded by a filter used during the synchronization process. Synchronizing (400) also includes an act (404) of updating the tracking information such that the particular object is not synchronized in the future. Finally, an act (406) of requesting a soft delete for the particular object is made at the wireless device to a sync manager of the wireless device.

Next, a step (408) for querying other device sync modules that synchronize the same store occurs. For each device sync module, an act of determining (410) whether the device sync module synchronizes the particular object is performed. If no other device sync modules are registered to synchronize the store of the device, permission to delete the object is granted (420). At (412), permission from other device sync modules to delete the particular object is either given or denied. If the soft delete request is denied by any of the device sync modules, the soft delete request is denied (418), and the particular object remains in the store of the wireless device. If permission is granted, then the particular object is updated in the tracking data (414) of that device sync module such that the object is no longer synchronized. At (416), a determination is made as to whether other device sync modules for the relevant store exist.

If all of the device sync modules have been queried and none object to the deletion of the particular object, the particular object is deleted from the store of the wireless device. If one of the device sync modules objects, then the particular object is not deleted from the store of the wireless device. However, each device sync module is aware that a soft delete request was made and appropriate actions, as previously described, are taken to ensure that the deletion is not propagated inadvertently to the remaining synchronization partners.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a device that synchronizes with one or more synchronization partners, a method for deleting an object from a store of the device without causing an inadvertent deletion of the one or more corresponding objects from one or more stores of the one or more synchronization partners when synchronizing the device with the one or more synchronization partners, the method comprising:

as a first act, while synchronizing the device with a first synchronization partner, using a filter that excludes an object so that it is not synchronized at the device, and thereby targeting that object for deletion at the device;

as a next act, requesting that the targeted object be deleted from the device;

thereafter, in response to the requested deletion of the targeted object, an act of determining whether other synchronization partners are synchronizing the targeted object; and as further acts, if it is determined that either the targeted object is not being synchronized with the any of the other synchronization partners, or that none of the other synchronization partners object to the requested deletion, then proceeding with deletion of the targeted object from the device, but otherwise, not deleting the targeted object from the device even though it is no longer synchronized with the first synchronization partner, thereby preventing any inadvertent deletion from other synchronization partners.

2. In a system including a device that synchronizes with one or more synchronization partners, a computer program product comprised of a computer-readable medium for storing computer-executable instructions for implementing a method for deleting an object from a store of the device without causing an inadvertent deletion of the one or more corresponding objects from one or more stores of the one or more synchronization partners when synchronizing the device with the one or more synchronization partners, and wherein the method is comprised of:

as a first act, while synchronizing the device with a first synchronization partner, using a filter that excludes an object so that it is not synchronized at the device, and thereby targeting that object for deletion at the device;

as a next act, requesting that the targeted object be deleted from the device;

thereafter, in response to the requested deletion of the targeted object, an act of determining whether other synchronization partners are synchronizing the targeted object; and as further acts, if it is determined that either the targeted object is not being synchronized with the any of the other synchronization partners, or that none of the other synchronization partners object to the requested deletion, then proceeding with deletion of the targeted object from the device, but otherwise, not deleting the targeted object from the device even though it is no longer synchronized with the first synchronization partner, thereby preventing any inadvertent deletion from other synchronization partners.

3. A method as defined in claim 1 or 2, wherein the act of synchronizing the device further comprises an act of the user specifying parameters of the filter.

4. A method as defined in claim 1 or 2, wherein the act of requesting that the targeted object be deleted further comprises an act of sending a soft delete request from a first device sync module associated with the first synchronization partner to a sync manager of the device.

5. A method as defined in claim 4, further comprising an act of updating tracking data of the first device sync module such that the first device sync module does not subsequently synchronize the targeted object with the first synchronization partner even if the targeted object is not deleted from the device.

6. A method as defined in claim 4, further comprising an act of the sync manager identifying other device sync modules associated with other synchronization partners that synchronize with the device by checking a sync client registration table maintained at the device.

7. A method as defined in claim 6, further comprising an act of updating the tracking data associated with the other synchronization partners such that the targeted object is not subsequently synchronized with the other synchronization partners even if the object is not deleted at the device.

8. A method as defined in claim 6, further comprising an act of the other device sync modules notifying the other synchronization partners that the object was soft deleted.

9. In a system including a device having a store, wherein the store is synchronized with one or more stores of one or more synchronization partners, a method for deleting an object from the store of the device without causing an inadvertent deletion of one or more corresponding objects from the one or more stores of the one or more synchronization partners when synchronizing the device with the one or more synchronization partners, the method comprising the following acts:

while synchronizing the device store with a first synchronization partner, using a filter that excludes an object so that it is not synchronized at the device, and thereby targeting that object for deletion at the device store;

sending a soft delete request for the targeted object from a first sync module at the device to a sync manager of the device, wherein the first device sync module is associated with the first synchronization partner;

thereafter, in response to the soft delete request for the targeted object, the sync manager determining whether any other synchronization partner is synchronizing the targeted object; and deleting the targeted object from the device store only if no other synchronization partner is synchronizing the object.

10. In a system including a device having a store, wherein the store is synchronized with one or more stores of one or more synchronization partners, a computer program product comprised of a computer-readable medium for storing computer-executable instructions for implementing a method for deleting an object from the store of the device without causing an inadvertent deletion of one or more corresponding objects from the one or more stores of the one or more synchronization partners when synchronizing the devices with the one or more synchronization partners, and wherein the method is comprised of the following acts:

while synchronizing the device store with a first synchronization partner, using a filter that excludes an object so that it is not synchronized at the device, and thereby targeting that object for deletion at the device store;

sending a soft delete request for the targeted object from a first sync module at the device to a sync manager of the device, wherein the first device sync module is associated with the first synchronization partner;

thereafter, in response to the soft delete request for the targeted object, the sync manager determining whether any other synchronization partner is synchronizing the targeted object; and deleting the targeted object from the device store only if no other synchronization partner is synchronizing the object.

11. In a system including a device having a device store, wherein the store is synchronized with one or more stores of one or more synchronization partners, a method for automatically deleting a data object from the store of the device without causing an inadvertent deletion of one or more corresponding data objects from the one or more stores of the one or more synchronization partners during a subsequent synchronization, the method comprising steps for:

as a result of synchronizing the device store with a store of a first synchronization partner, generating a soft delete request for a targeted data object at the device store;

querying all other synchronization partners of the device to determine if the targeted data object is synchronized by any of the other synchronization partners;

granting the soft delete request only if no other synchronization partner is synchronizing the targeted data object, and no other synchronization partner denies permission for the soft delete request, and otherwise, denying the soft delete request.

12. For a system including a device having a device store, wherein the device store is synchronized with one or more stores of one or more synchronization partners, a computer program product comprising one or more computer-readable media having computer-executable instructions that implement a method of automatically deleting a data object from the store of the device without causing an inadvertent deletion of one or more corresponding data objects from the one or more stores of the one or more synchronization partners during a subsequent synchronization, the method comprising steps for:

as a result of synchronizing the device store with a store of a first synchronization partner, generating a soft delete request for a targeted data object at the device store;

querying all other synchronization partners of the device to determine if the targeted data object is synchronized by any of the other synchronization partners;

granting the soft delete request only if no other synchronization partner is synchronizing the targeted data object, and no other synchronization partner denies permission for the soft delete request, and otherwise, denying the soft delete request.

13. A method as defined in claim 9 or 10, further comprising an act of receiving the soft delete request from the first synchronization partner, wherein the soft delete request informs the first device sync module that the object is excluded by the filter and may be deleted from the store of the device.

14. A method as defined in claim 9 or 10, wherein sending the soft delete request from the first sync module at the device further comprises an act of the first sync module updating tracking data that is associated with the first synchronization partner such that the targeted object is no longer synchronized by the first synchronization partner.

15. A method as defined in claim 9 or 10, wherein the other synchronization partners that synchronize the store of the device are registered in a table of the sync manager.

16. A method as defined in claim 9 or 10, further comprising an act of not synchronizing the targeted object in future synchronizations between the device and the first synchronization partner.

17. A method as defined in claim 9 or 10, wherein the act of deleting the targeted object from the device store further comprises an act of other device sync modules updating their tracking data such that the deletion of the targeted object at the device store is not propagated to the corresponding objects of any other synchronization partners corresponding to the other device sync modules.

18. A method as defined in claim 9 or 10, further comprising:

an act of the first device sync module tracking that the targeted object was soft deleted; and an act of ensuring that the other synchronization partners do not delete corresponding objects from stores of the synchronization partners.

19. A method as defined in claim 9 or 10, further comprising:

an act of allowing the other synchronization partners to delete the targeted object from their stores; and an act of preventing the targeted object from being deleted from a store of the first synchronization partner.

20. A method as defined in claim 11 or 12, wherein the step for synchronizing the device store further comprises:

an act of detecting that the data object does not meet parameters of a filter used during the synchronization of the device store with the store of the first synchronization partner;

an act of updating the tracking data of a first device sync module for the data object such that the object is no longer synchronized, the first device sync module associated with the first synchronization partner; and an act of the first device sync module sending the soft delete request to a sync manager.

21. A method as defined in claim 20, wherein the step for querying all other synchronization partners further comprises:

an act of a sync manager, which receives the soft delete request, determining if other device sync modules track the targeted data object;

if so, an act of determining whether the other device sync modules object to the deletion of the targeted data object;

an act of not deleting the targeted data object when one of the other device sync modules objects to the deletion of the targeted data object; and an act of updating tracking data of the other device sync modules that do not object to the deletion of the targeted data object such that the targeted data object is no longer synchronized through the other device sync modules.

22. A method as defined in claim 11 or 10, further comprising a step for ensuring that the targeted data object is not deleted from any of the synchronization partners.

23. A method as defined in claim 22, further comprising an act of the other device sync modules notifying their corresponding synchronization partner that a soft delete was performed on the data object.

* * * * *

UNITED STATES PATENT AND TRADEMARK OFFICE

CERTIFICATE OF CORRECTION

PATENT NO. : 7,017,105 B2
APPLICATION NO. : 09/775953
DATED : March 21, 2006
INVENTOR(S) : Stephen D. Flanagin et al.

It is certified that error appears in the above-identified patent and that said Letters Patent is hereby corrected as shown below:

On the title page, in item (56), under "Foreign Patent Documents", in column 2, line 1, after "8/2000" insert -- G06F/17/30 --.

In column 1, line 16, after "wireless" insert -- , --.

In column 2, line 19, after "computer" delete "," and insert -- . --, therefor.

In column 7, line 48, after "user" delete "," and insert -- . --, therefor.

In column 11, line 35, in Claim 3, delete "claim" and insert -- claims --, therefor.

In column 11, line 38, in Claim 4, delete "claim" and insert -- claims --, therefor.

In column 12, line 48, in Claim 11, after "wherein the" insert -- device --.

In column 13, line 25, in Claim 13, delete "claim" and insert -- claims --, therefor.

In column 13, line 32, in Claim 14, delete "claim" and insert -- claims --, therefor.

In column 13, line 38, in Claim 15, delete "claim" and insert -- claims --, therefor.

In column 13, line 41, in Claim 16, delete "claim" and insert -- claims --, therefor.

In column 13, line 45, in Claim 17, delete "claim" and insert -- claims --, therefor.

In column 13, line 52, in Claim 18, delete "claim" and insert -- claims --, therefor.

In column 14, line 6, in Claim 19, delete "claim" and insert -- claims --, therefor.

In column 14, line 13, in Claim 20, delete "claim" and insert -- claims --, therefor.

In column 14, line 20, in Claim 20, after "updating" delete "the".

UNITED STATES PATENT AND TRADEMARK OFFICE

CERTIFICATE OF CORRECTION

PATENT NO. : 7,017,105 B2
APPLICATION NO. : 09/775953
DATED : March 21, 2006
INVENTOR(S) : Stephen D. Flanagin et al.

It is certified that error appears in the above-identified patent and that said Letters Patent is hereby corrected as shown below:

In column 14, line 45, in Claim 22, delete “claim” and insert -- claims --, therefor.

Signed and Sealed this

Eleventh Day of August, 2009

David J. Kappos
*Director of the United States Patent and Trademark Office*